United States Patent
Karaoguz et al.

(10) Patent No.: US 8,145,219 B2
(45) Date of Patent: Mar. 27, 2012

(54) HANDOFF OF A MULTIMEDIA CALL SESSION USING BACKGROUND NETWORK SCANNING

(75) Inventors: Jeyhan Karaoguz, Irvine, CA (US); James D. Bennett, San Clemente, CA (US); Nambirajan Seshadri, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 11/093,940

(22) Filed: Mar. 30, 2005

(65) Prior Publication Data

US 2006/0025151 A1 Feb. 2, 2006

Related U.S. Application Data

(60) Provisional application No. 60/591,735, filed on Jul. 28, 2004, provisional application No. 60/591,847, filed on Jul. 28, 2004, provisional application No. 60/591,844, filed on Jul. 28, 2004, provisional application No. 60/591,841, filed on Jul. 28, 2004, provisional application No. 60/591,845, filed on Jul. 28, 2004, provisional application No. 60/591,843, filed on Jul. 28, 2004, provisional application No. 60/591,842, filed on Jul. 28, 2004.

(51) Int. Cl.
*H04W 36/00* (2009.01)

(52) U.S. Cl. ............. 455/437; 455/432.1; 455/436; 455/439; 455/442; 455/443; 370/331; 370/332; 370/333; 370/334

(58) Field of Classification Search .......... 455/432.1, 455/436–444; 370/331, 332, 333, 334
See application file for complete search history.

(56) References Cited

U.S. PATENT DOCUMENTS

| | | | | |
|---|---|---|---|---|
| 6,816,730 | B2 * | 11/2004 | Davies et al. | 455/436 |
| 6,950,655 | B2 * | 9/2005 | Hunkeler | 455/426.1 |
| 7,006,828 | B1 * | 2/2006 | Czaja et al. | 455/442 |
| 7,065,353 | B1 * | 6/2006 | Bolinth et al. | 455/426.1 |
| 7,260,079 | B1 * | 8/2007 | Chapman et al. | 370/338 |
| 2002/0193116 | A1 * | 12/2002 | Agrawal et al. | 455/445 |
| 2003/0193910 | A1 | 10/2003 | Shoaib et al. | |
| 2004/0063426 | A1 | 4/2004 | Hunkeler | |
| 2004/0180661 | A1 * | 9/2004 | Chen et al. | 455/436 |
| 2004/0218564 | A1 * | 11/2004 | Henrikson | 370/331 |
| 2005/0043035 | A1 * | 2/2005 | Diesen et al. | 455/454 |
| 2005/0090277 | A1 * | 4/2005 | Islam et al. | 455/525 |

FOREIGN PATENT DOCUMENTS

| | | |
|---|---|---|
| WO | WO 96-24226 A1 | 8/1996 |
| WO | WO-96/24226 A | 9/1996 |
| WO | WO 02-01807 A2 | 1/2002 |
| WO | WO-02/11485 A | 2/2002 |
| WO | WO 02-11485 A2 | 2/2002 |

\* cited by examiner

*Primary Examiner* — Justin Lee

(74) *Attorney, Agent, or Firm* — Brinks Hofer Gilson & Lione

(57) ABSTRACT

A method and system supporting handoff of a multimedia call session using background network scanning is disclosed. A mobile multimedia handset may engage in the exchange of a multimedia information stream via a first wireless network, and may sniff a portion of radio frequency spectrum for a second wireless network. Information about available services and network quality of service for the second network may be received by querying the second wireless network or from advertising by the second wireless network. Hand-off between the two networks may be based upon the results of the comparison and one or more user-defined criteria, and the handoff may be synchronized according to predefined events in the stream of multimedia information.

46 Claims, 10 Drawing Sheets

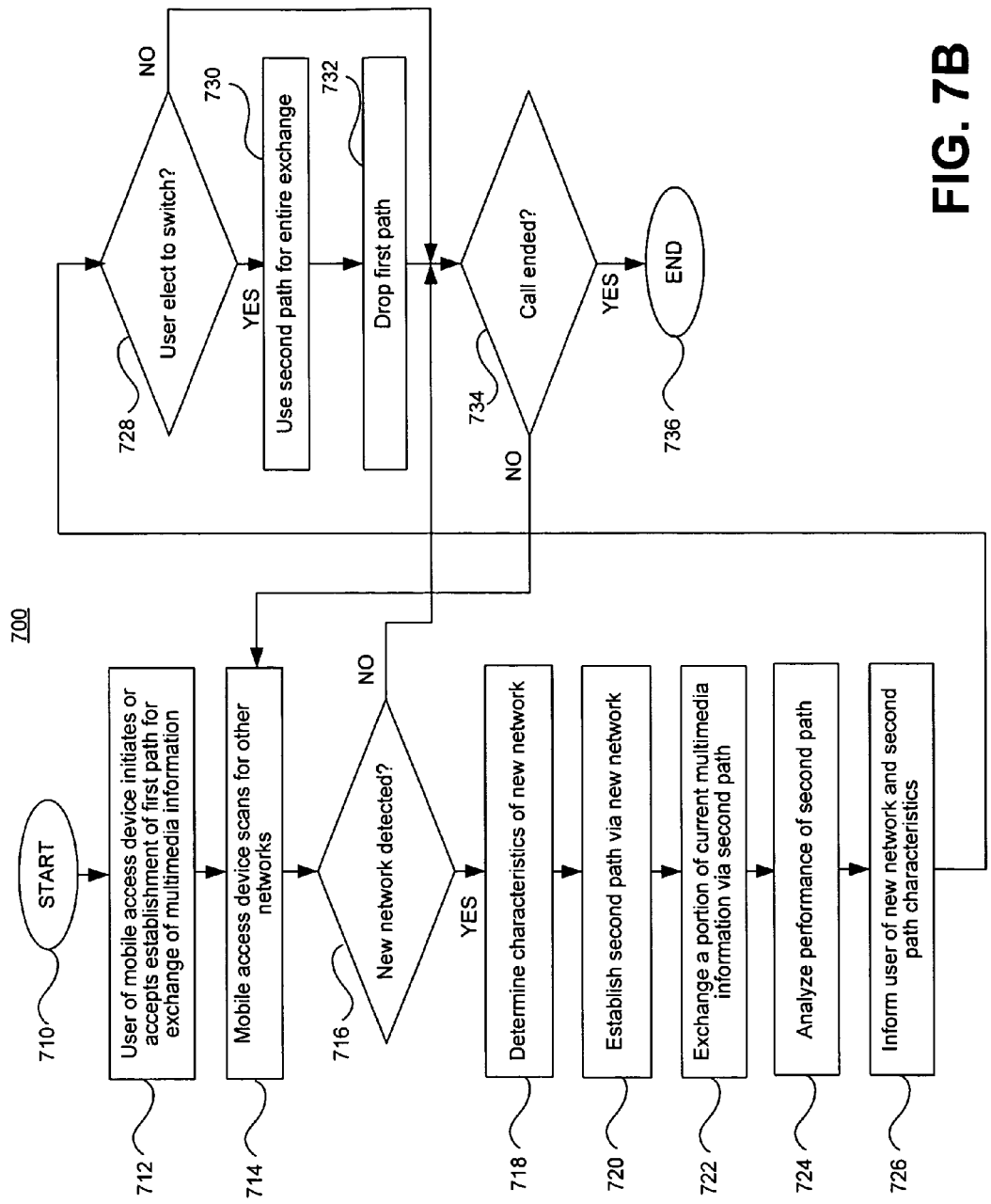

# HANDOFF OF A MULTIMEDIA CALL SESSION USING BACKGROUND NETWORK SCANNING

RELATED APPLICATIONS

The present application makes reference to, claims priority to, and claims the benefit of the following U.S. Provisional Patent Applications, the complete subject matter of each of which is hereby incorporated herein by reference, in its entirety.

| Serial No. | Attorney Docket No. | Title | Date Filed |
|---|---|---|---|
| 60/591,735 | 15884US01 BP3837 | Method and System for Handoff Through Simulcasting | Jul. 28, 2004 |
| 60/591,847 | 15885US01 BP3838 | Method and System for Handling Calls Through Simulcasting | Jul. 28, 2004 |
| 60/591,844 | 15886US01 BP3839 | Method and System for Handling Multimedia Information Through Simulcasting | Jul. 28, 2004 |
| 60/591,841 | 15887US01 BP3840 | Method and System for Simulcasting or Multicasting Multimedia Information in a Broadband Wired and/or Wireless LAN or Personal Area Network (PAN) Via a Broadband Access Gateway | Jul. 28, 2004 |
| 60/591,845 | 15888US01 BP3841 | Method and System for Consuming Simulcasted and Multicasted Content in a PAN/WAN/WLAN Serviced by a Broadband Access Gateway | Jul. 28, 2004 |
| 60/591,843 | 15889US01 BP3842 | Method and System for Handoff of a Multimedia Stream by Sniffing | Jul. 28, 2004 |
| 60/591,842 | 15890US01 BP3843 | Method and System for Sniffing to Provide Association with a New Network | Jul. 28, 2004 |

The present application also makes reference to U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety.

The present application also makes reference to U.S. patent application Ser. No. 11/094,045, entitled "Handling Of Multimedia Call Sessions And Attachments Using Multi-Network Simulcasting", filed Mar. 30, 2005, now U.S. Pat. No. 7,684,374, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GHz.

Users of wireless access devices may migrate within the coverage areas of a number of wireless networks while using an access device. A user may be aware of the existence of the various wireless networks, and may take advantage of such networks when in a geographic location served by a known wireless network. Many more wireless networks may exist than those of which the user is aware, and the user of a wireless access device may therefore be unaware of the opportunity to make use of those other networks for communication. Some of the available networks may be suitable for the communication activities of a particular access device user, while others may not. In addition, wireless service providers are continually adding new network capabilities and features, and new wireless service providers enter the market each day. Depending upon the number of active subscribers and/or users, and the activities of each subscriber and/or user, a wireless network that one day provides satisfactory quality of service may, on another day or at another time, be unable to meet a particular wireless access device user's needs. At the present time, there is no way for a user of a wireless access device to have up-to-date information of the service provider options available to them, and to know what services and/or features each service provider has available.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method supporting hand-off of a multimedia call session using background network scanning, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 7B is a flowchart illustrating another exemplary method of supporting hand-off of a mobile access device such as, for example, the mobile access device of FIG. 2 using background network scanning, in accordance with a representative embodiment of the present invention.

DETAILED DESCRIPTION OF THE INVENTION

Aspects of the present invention relate to communication over hybrid wired and wireless networks. More specifically, certain embodiments of the present invention relate to a method and system for hand-off of a multimedia call session using background network scanning. A multimedia call session may comprise, for example, one or more streams of multimedia information. In representative embodiments of the present invention, background network scanning may comprise, for example, sniffing of a wireless network environment. A representative embodiment of the present invention allows a user of a wireless access device greater freedom of movement, and a wider variety of communication options than is available using conventional technology.

An aspect of the invention provides seamless merging of wide area networks (WANs), from any kind of wired and/or wireless wide area networks, to pockets of wired and/or wireless local area networks (WLANs) and personal area network (PANs), which may be located in homes or other environment such as an office or business. The merging of these various types of networks enables transparent communication of all types of media between access devices, which may be wired or wirelessly coupled to one or more of these networks. Seamless communication may be provided to access devices as they transition from one type of network to another type of network. In a representative embodiment of the present invention, a user of a wireless access device engaged in a communication session may be kept aware of other wireless networks providing service at their present location, and may elect to make use of one of those other networks to continue their current communication activity.

Figure 1:
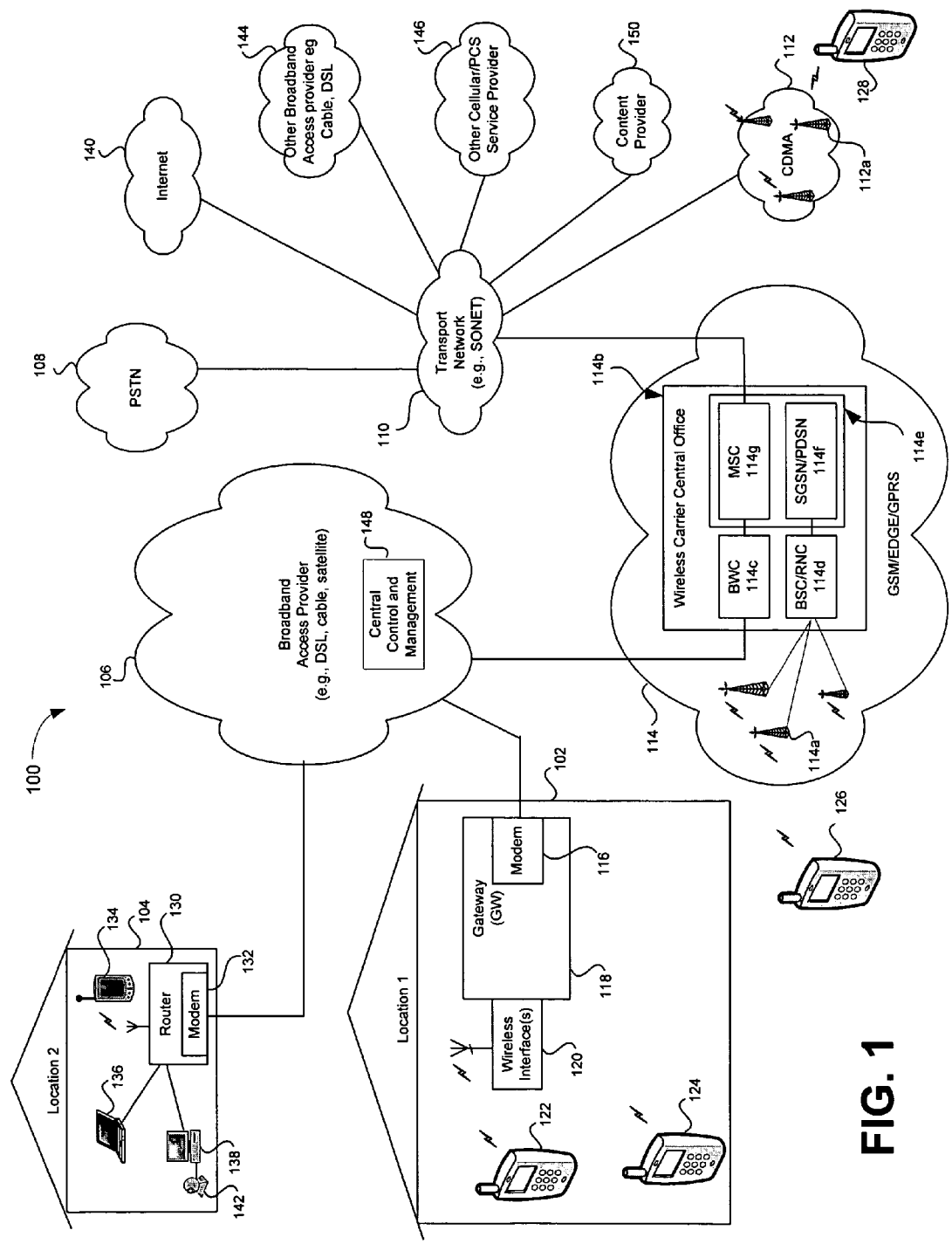
FIG. 1 is a block diagram illustrating an architecture of an exemplary communications system in which a representative embodiment of the present invention may be practiced.

FIG. 1 is a block diagram illustrating an architecture of an exemplary communications system in which a representative embodiment of the present invention may be practiced. Referring to FIG. 1, there is shown a first location 102, a second location 104, a broadband access provider (BAP) 106, a public switched telephone network (PSTN) 108, a transport network 110, wireless service provider networks including a CDMA network 112 and a GSM/EDGE/GPRS network 114, and access devices 122, 124, 126, and 128. The first location 102 comprises a gateway 118 having a modem 116, a wireless interface(s) block 120, and the access devices 122, 124. The access devices 122, 124, 126, 128 may comprise, for example, a mobile multimedia handset having a high level of functionality such as, for example, that of one or more of a digital video or still camera, a portable audio (MP3) player, a personal digital assistant, and a voice handset. The access devices 122, 124, 126, 128 may be capable of operating using, for example, a personal area network and/or wireless local area network compliant with, for example, Bluetooth, IEEE 802.11a/b/g/n, and/or IEEE 802.15.3a ultra-wideband standards. The second location 104 comprises a router 130 having a modem 132, and a plurality of wireless access devices. The plurality of wireless access devices at the second location 104 may comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. The wireless interface block 120 may comprise a plurality of interfaces such as a Bluetooth interface, an IEEE 802.15.3a ultra-wideband interface, and any combination of an IEEE 802.11a, b, g and/or n interface.

FIG. 1 also comprises an "other broadband access provider" block 144, an "other cellular/PCS service provider" block 146, a central control and management block 148, and content provider 150. The "other broadband access provider block 144" may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning, service management, and accounting. In a representative embodiment of the present invention, the central control and management block 148 may establish communications links with, for example, the gateway 118, the broadband access provider 106, the other broadband access provider 144, the other cellular/PCS service provider 146, the CDMA network 112, and the GSM/EDGE/GPRS network 114 using actual or virtual connections.

The broadband access provider 106 may be, for example, a cable operator, telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM/EDGE/GPRS networks 112, 114 may comprise a plurality of cell sites (a/k/a cellular towers) that are located in geographical cells within each of the networks. Within the GSM/EDGE/GPRS network 114, each of the cell sites such as, for example, cell site 114a may comprise a base transceiver station (BTS), and one or more base transceiver stations (BTSs) may be coupled to wireless carrier central office 114b. The wireless carrier central office 114b may comprise a base station controller/radio network controller (BSC/RNC) such as BSC/RNC 114d. One or more base station controllers/radio network controllers (BSCs/RNCs) may be coupled to the core network 114e, that comprises a network edge switch called a mobile switching center (MSC), such as MSC 114g, and a serving GPRS support node (SGSN)/packet data serving node (PDSN) 114f, of the GSM/EDGE/GPRS network 114. The mobile switching center may be coupled to, for example, the PSTN 108 via the transport network 110. As an access device moves out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off.

As an illustration, a user may be on their way home and as the user approaches their home, the signal may fall below a minimum signal power threshold that is required to maintain a call. However, instead of dropping the call, the call may be handed off to, for example, a PAN or a wireless local area network (WLAN) that may be located within the user's home or an unlicensed wireless access system that may be located in the user's home. For example, with reference to FIG. 1, as access device 126 migrates from the vicinity of the serving cell site 114a in GSM/EDGE/GPRS network 114 towards the wireless interface 120 in the first location 102, the call may be handed off from the cell site 114a of the GSM/EDGE/GPRS network 114 to the wireless interface 120 coupled to the gateway (GW) 118 at the first location 102. Accordingly, instead of the call being dropped, the call has been seamlessly handed off and is now being handled by the gateway 118 via the wireless interface 120. The resulting wireless data may then be communicated to the GSM/EDGE/GPRS network 114 via the broadband connection to the BAP 106 which is connected to the broadband wireless local area network controller (BWC) 114c.

In a representative embodiment of the present invention, a mobile access device such as, for example, the mobile access device 124 of FIG. 1 may be adapted to sniff for compatible broadband access networks and their available services, while the mobile access device moves from one point to another and is currently being serviced by another wireless service provider such as, for example, the GSM/EDGE/GPRS network 114. Accordingly, whenever the mobile access device 124 is within range of a broadband access gateway or access point such as, for example, the broadband access gateway 118 and wireless interface 120 of FIG. 1, the mobile access device 124 may be adapted to inform a wireless carrier central office at its current wireless service provider (e.g., the wireless carrier central office 114b of the GSM/EDGE/GPRS network 114) that a broadband access gateway or access point has been detected. More generally, the mobile access device 124 may notify the current wireless carrier central office of the serving wireless service provider that a second communication path or channel (e.g., the gateway 118 with wireless interface 120) has been detected and is available for communicating with the wireless service provider (e.g., the GSM/EDGE/GPRS network 114). In a wide area wireless network such as the GSM/EDGE/GPRS network 114 of FIG. 1, the current wireless carrier central office may be defined by the cell site that is currently providing service to the mobile access device.

In response to receiving a notification that a mobile access device such as, for example, the mobile access device 124 has found an alternate communication path, the serving wireless carrier central office (e.g., the wireless carrier central office 114b) in a representative embodiment of the present invention may automatically cause pricing information and/or content information to be presented on a display of the mobile access device 124. Alternatively, the mobile access device 124 may be adapted to request pricing information and/or content information from the serving wireless carrier central office via the wireless communication path established by the wireless service provider (e.g., GSM/EDGE/GPRS network 114). Notwithstanding, a user of the mobile access device 124 may select from various options presented on the display of the mobile access device 124, which communication path best suits their needs. In some representative embodiments, the pricing information may also include a comparison between the cost of service for the serving wireless service provider and for that of competing wireless networks.

In another representative embodiment of the present invention, the serving wireless carrier central office may also provide a list of media content information or other services that may be provided to the mobile access device 124. For example, the serving wireless carrier central office may provide a list of files, their associated formats, and associated costs/charges of those that may be available for downloading by the mobile access device 124.

In yet another representative embodiment of the present invention, a mobile access device such as, for example, the mobile access device 124 may be currently receiving service via a first pathway from a wireless service provider such as the GSM/EDGE/GPRS network 114, for example. Although this example refers to receiving service, the service may comprise either or both of receiving and sending of multimedia information. As the mobile access device 124 moves from one location to another, the mobile access device 124 may sniff a portion of radio frequency spectrum and locate a second communication network, which may be provided by, for example, a broadband access gateway, a wireless access point or a hot spot. In response to detecting the second communication network, the mobile access device 124 may be adapted to query the second communication network in order to determine the type of services and the quality of service (QoS) that may be offered. In another aspect of the invention, the second communication network may advertise the types of services and QoS it provides, in which case, the mobile access device will automatically know the type of services that are offered by the second communication network. Quality of service may comprise, for example, error rates, frame rates, spatial resolution, color depth, sample rates, bits per sample, network delays, and the like. Notwithstanding, the mobile access device 124 may inform the wireless service provider that it has sniffed out a new network and new information content. The mobile access device 124 may be adapted to compare the QoS of the first communication network with the QoS of the second communication network and desired service selections may be made based on this comparison. For example, if the second communication network is capable of providing a higher QoS than the first communication network, then a user of the mobile access device may choose to switch operation to the second communication network. If, for example, use of the second network is cost prohibitive, the user of the mobile access device 124 may choose to remain in communication with the first communication network in order to save on cost. Switching from one communication network to another communication network may be automatic or manual.

In accordance with an embodiment of the invention, service may be automatically switched from a first communication network to a second communication network based on a given criteria. The criteria may reside within the mobile access device and/or at a wireless carrier central office, for example, and may be set by the subscriber/user of the mobile access device. Accordingly, the mobile access device may switch from one communications network to another based on occurrence of the given criteria. In some representative embodiments of the present invention, switching of wireless service from one communication network to another may be adapted to occur at certain predetermined reference or synchronizations points in the communication of the information content being exchanged. For example, if an Motion Picture Experts Group (MPEG)-encoded information stream is being received, then the next reference frame in the multimedia information stream may be located and switching or hand-off between communication networks may occur at that reference frame. Various rules may be utilized to facilitate the switch.

Figure 2:
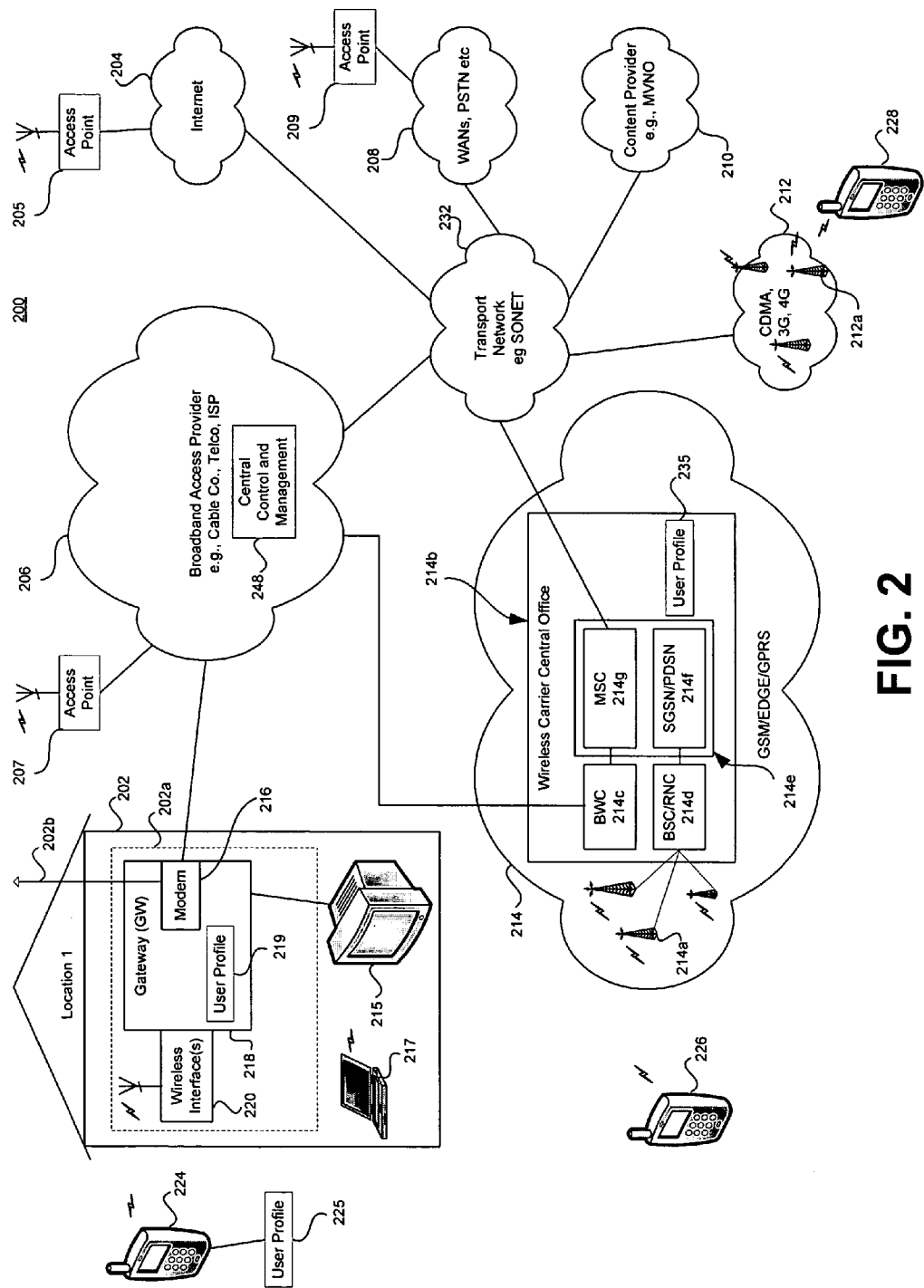
FIG. 2 shows a block diagram illustrating an exemplary communication system that may be utilized for handoff of a multimedia call session using background network scanning of radio frequency spectrum in, for example, a broadband wireless local area network (WLAN) or personal area network (PAN), in accordance with a representative embodiment of the present invention.

FIG. 2 shows a block diagram illustrating an exemplary communication system 200 that may be utilized for handoff of a multimedia call session using background network scanning of radio frequency spectrum in, for example, a broadband wireless local area network (WLAN) or personal area network (PAN), in accordance with a representative embodiment of the present invention. In a representative embodiment of the present invention, background network scanning may comprise, for example, the sniffing of one or more portions of radio frequency spectrum. The exemplary communication system 200 of FIG. 2 may provide handoff through scanning for wireless network traffic, for an active subscriber, from a wireless service provider servicing the active subscriber to a broadband wired and/or a wireless LAN (WLAN), and/or PAN using a broadband access gateway. Referring to FIG. 2, there is shown a first location 202, a broadband access provider (BAP) 206, a transport network block 232, an Internet 204, a WANs, PSTN, etc networks block 208, a content providers block 210, wireless wide area service provider networks 212, 214, access points 205, 207, 209, and a plurality of mobile access devices 224, 226, 228. The illustration of FIG. 2 also comprises a central control and management block 248 that may correspond, for example, to the central control and management block 148 of FIG. 1.

The first location 202 comprises a broadband access gateway 218 with a modem 216, a wireless interface 220, and a user profile 219. The first location may be a home, and the broadband access gateway 218 with the modem 216 and the wireless interface 220 may support a personal area network (PAN) and/or wireless local area network (WLAN), and may be referred to as a home network 202a. The wireless interface 220 may comprise a plurality of interfaces such as a Bluetooth interface, an IEEE 802.15.3a ultra-wideband interface, and any combination of IEEE 802.11a, b, g and/or n interfaces. In a representative embodiment of the present invention, the broadband access gateway 218 may comprise, for example, a set top box that may be coupled in a wireless or wired fashion to access devices such as, for example, a laptop computer or television, such as the laptop 217 and the television 215 of FIG. 2. Service may be provided to the home network 202a supported by the broadband access gateway 218 via the cable modem 216, which is coupled to the broadband access provider 206. The wireless interface 220, the gateway 218 with modem 216, the BAP 206, the GSM/EDGE/GPRS network 214, the transport network 232, and the CDMA network 236 of FIG. 2 may correspond, for example, to the wireless interface 120, the gateway 118 with modem 116, the BAP 106, the GSM/EDGE/GPRS network 114, the transport network 110, and the CDMA network 112, respectively, of FIG. 1.

The broadband access provider 206 may be, for example, a cable company, telephone company (Telco), or an Internet service provider (ISP). The broadband access provider 206 may utilize any of the standardized formats such as DOCSIS, digital subscriber line (DSL), or local multipoint distribution system (LMDS). LMDS utilizes broadband wireless technology to deliver voice, video, data, and/or Internet services utilizing licensed or unlicensed spectrum in the frequency range of 25 GHz and higher. LMDS utilizes point-to-point or point-to-multipoint communication to provide broadband services, some of which rely on line of sight (LOS). LMDS is a fixed wireless solution, and as such, no mobility support is required.

The broadband access provider 206 may be also be a WiMAX or Institute of Electrical and Electronics Engineers, Inc. (IEEE) 802.16-compliant service provider. The IEEE 802.16 standard offers a wireless metropolitan area network (MAN) air interface which provides network access to buildings via external antennas that receive signals from a remotely located central base station. The signal received at the building may be communicated to a wired network infrastructure such as an IEEE 802.3 compliant communication network, or a wireless network infrastructure such as an IEEE 802.11a/b/g and/or n-compliant network. In instances where WiMAX is utilized, then antenna 202b may be utilized to receive and transmit signals between the broadband access provider 206 and the home network 202a.

The WANs, PSTN, etc networks block 208 may comprise networks such as private or public communication networks. For example, the WANs, PSTN, etc networks block 208 may comprise a public switched telephone network (PSTN) and a packet network such as a cellular digital packet data (CDPD) network.

The content providers block 210 may comprise network providers, which supply data and/or multimedia content. In a representative embodiment of the present invention, the content providers block 210 may comprise, for example, one or more mobile virtual network operators (MVNOs). A MVNO is a mobile service provider that provides mobile services to its subscribers by utilizing the network infrastructure of another company. In this regard, the MVNO enters into an agreement with a network operator to purchase network time such as minutes, which it resells to it own customers/subscribers. The MNVO utilizes the purchased time to provide, for example, multimedia content delivery to its subscribers.

The wireless service provider network 212 may, for example, utilize CDMA, 3G or 4G access technology and may comprise a plurality of cell sites. Cell site 212a may provide cellular service to the mobile access device 228 while the mobile access device 228 is within range of the cell site 212a. The wireless service provider network 214 may, for example, utilize the time division multiple access (TDMA) access technology of the GSM standard, and may include enhanced data rates for GSM evolution (EDGE) and/or general packet radio service (GPRS) data capability. The wireless service provider network 214 may comprise a plurality of cell sites and a wireless carrier central office 214b, the latter of which may comprise a mobile switching center (MSC) 214g. Cell site 214a may provide cellular service to mobile access device 226 while the mobile access device 226 is within range of the cell site 214a.

With reference to FIG. 2, in accordance with a representative embodiment of the present invention, a mobile access device 224 may be currently receiving service via a first pathway from, for example, a wireless service provider 214. Although this example refers to receiving service, the service may, for example, comprise either or both of receiving and sending of multimedia information. As the mobile access device moves from network 214 towards network 202a, the mobile access device may sniff a portion of radio frequency spectrum and locate the second communication network 202a, which may be accessible by, for example, a broadband access gateway 218, a wireless access point, or a hot spot. The wireless service provider 214 and the second communication network 202a may, for example, occupy separate portions of radio frequency spectrum and/or employ the same or incompatible communication protocols. In response to detecting the second communication network 202a, the mobile access device 224 may be adapted to query the second communication network 202a in order to determine the type of services and QoS that are offered. Quality of service may comprise, for example, error rates, frame rates, spatial resolution, color depth, sample rates, bits per sample, network delays, and the like. In another aspect of the invention, the second communication network 202a may advertise the types of services and QoS it provides, in which case, the mobile access device 224 may automatically know the type of services that are offered by the second communication network. Notwithstanding, the mobile access device 224 may inform the wireless service provider 214 that it has sniffed out a new network and new information content. The mobile access device may be adapted to compare the QoS of the first communication network 214 with the QoS of the second communication network 202a and desired service selections may be made based on this comparison. For example, if the second communication network 202a is capable of providing a higher QoS than the first communication network 214, then a user of the mobile access device 224 may choose to switch operation to the second communication network 202a. If, for example, use of the second network is cost prohibitive, the user of the mobile access device 224 may choose to remain in communication with the first communication network 202a in order to save on cost. Switching or hand-off from one communication network to another communication network may be automatic or manual.

In accordance with an embodiment of the invention, service may be automatically switched from a first communication network 214 to a second communication network 202a based on a given criteria. Accordingly, the mobile access device 224 may switch from one network to another based on occurrence of the given criteria. Switching may be adapted to occur at certain reference or synchronizations points. For example, if an MPEG information stream is being received, then the next reference frame may be located and switching may occur at that reference frame. Various rules may be established and utilized to facilitate the switch.

In one representative embodiment of the present invention, a mobile access device such as, for example, the mobile access devices 224 may be served by a wireless wide area network such as the GSM/EDGE/GPRS network 214. While being served by the GSM/EDGE/GPRS network 214, the mobile access device 224 may function to "sniff" the radio frequency spectrum in which the mobile access device 224 is capable of operating to detect the presence of other communication networks. Upon detecting the presence of other communications network(s), the mobile access device 224 may notify the current serving wireless wide area network (e.g., the GSM/EDGE/GPRS network 214) of the presence of the newly detected network(s). The mobile access device 224 may provide details of the nature of the newly detected network such as, for example, the frequency band used, bit rate(s) supported, type of modulation, protocol parameters, quality of service (QoS) indicators, and other information. The mobile access device 224 may request the serving wireless wide area network (e.g., the GSM/EDGE/GPRS network 214) to provide, for example, what services the other network(s) may support, the cost of services available via the other network(s), network performance information such as available bandwidth and transmission delays, information and/or parameters used to enable access (e.g., radio frequencies used, security keys or methods used, access protocols supported, bit rates, modulation types, operator identification), and other factors. In another representative embodiment of the present invention, the mobile access device 224 may contact network entities other than the elements of the serving wireless wide area network. For example, the mobile access device 224 of FIG. 2 may contact an Internet-based database containing information about wireless networks available for service, using the current serving wireless wide area network. The mobile access device 224 may inquire about the existence and availability of any networks having for example, the detected frequency band used, bit rate(s) supported, type of modulation, protocol parameters, quality of service (QoS) indicators, and other information. The database may respond by providing information identifying the detected network, available services, costs, bandwidths, bit rate, protocols, and the operator identifier for the detected network.

In another representative embodiment of the present invention, a mobile access device such as, for example, the mobile access devices 224 of FIG. 2 may be served by a wireless wide area network such as the GSM/EDGE/GPRS network 214. While being served by the GSM/EDGE/GPRS network 214, the mobile access device 224 may function to "sniff" the radio frequency spectrum in which the mobile access device 224 is capable of operating to detect the presence of other communication networks. Upon detecting the presence of other communications network(s), the mobile access device 224 may inquire of a newly detected communication network, for example, what services the new network has to offer, the cost of services that are available via the new network, and network performance information such as, for example, the amount of available bandwidth, transmission delays, error rates, and other factors. In the GSM/EDGE/GPRS network 214 of FIG. 2, such information may be provided by, for example, the wireless carrier central office 214b. In one representative embodiment of the present invention, the mobile access device 224 may notify the user of detection of the new network, and may prompt the user to determine whether a switch or hand-off between communication networks is desired, and may present the user with the information about the services the other network has to offer, the cost of services that are available via the new network, and network performance information such as, for example, the amount of available bandwidth and transmission delays.

Figure 3:
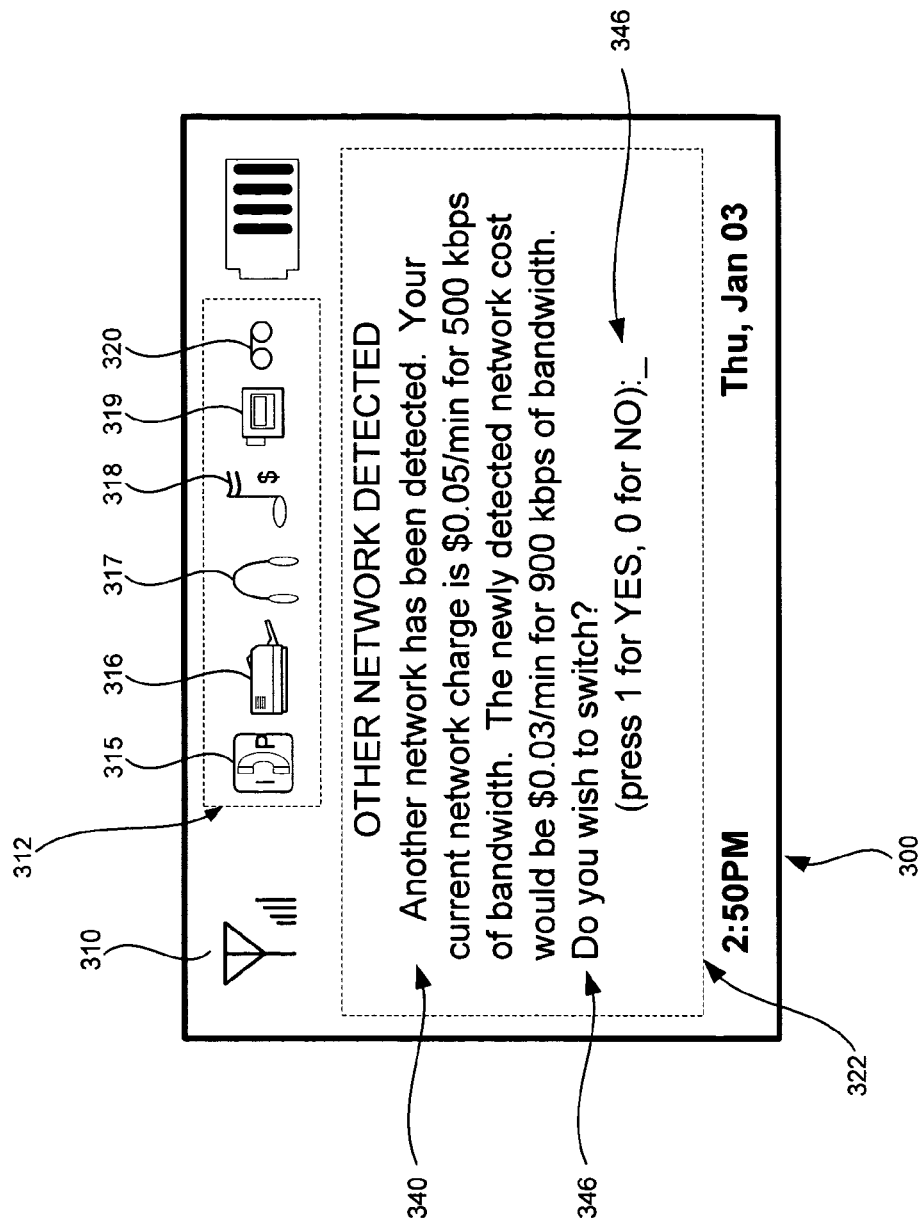
FIG. 3 shows an exemplary display notifying a user of a mobile access device that may correspond to, for example, the mobile access device of FIG. 2, of the detection of a new communication network, in accordance with a representative embodiment of the present invention.

FIG. 3 shows an exemplary display 300 notifying a user of a mobile access device that may correspond to, for example, the mobile access device 224 of FIG. 2, of the detection of a new communication network, in accordance with a representative embodiment of the present invention. The display 300 of FIG. 3 comprises a network indicator 310, a network services indicator area 312, a battery life indicator, a time of day indicator, and a day and date indicator. In addition, in the example of FIG. 3, the network services indicator area 312 has been updated to comprise an Internet protocol (IP) phone service icon 315, a printer service icon 316, a stereo entertainment icon 317, a pay music service icon 318, a video entertainment icon 319, and a storage service icon 320 showing those services advertised by the wireless broadband access gateway as being available. The display 300 also comprises a display area 322 to allow an access device to present graphical or textual information for a variety of reasons and from a number of sources. In the illustration of FIG. 3, the mobile access device has displayed information 340 about a newly detected network, and has included a prompt 346 requesting a user response 348 of whether a switch to the newly detected network should be performed.

In another representative embodiment of the present invention, the mobile access device 224 may automatically choose to switch to being served by the newly detected network. The decision to change networks may be based upon a set of criteria comprising guidelines, rules, and parameters, for example, that may be determined by the user of the mobile access device 224 and stored in a user profile or subscriber database such as, for example, the user profile 219 on the mobile access device 224 or the user profile 235 at the wireless carrier central office 214b.

Figure 4:
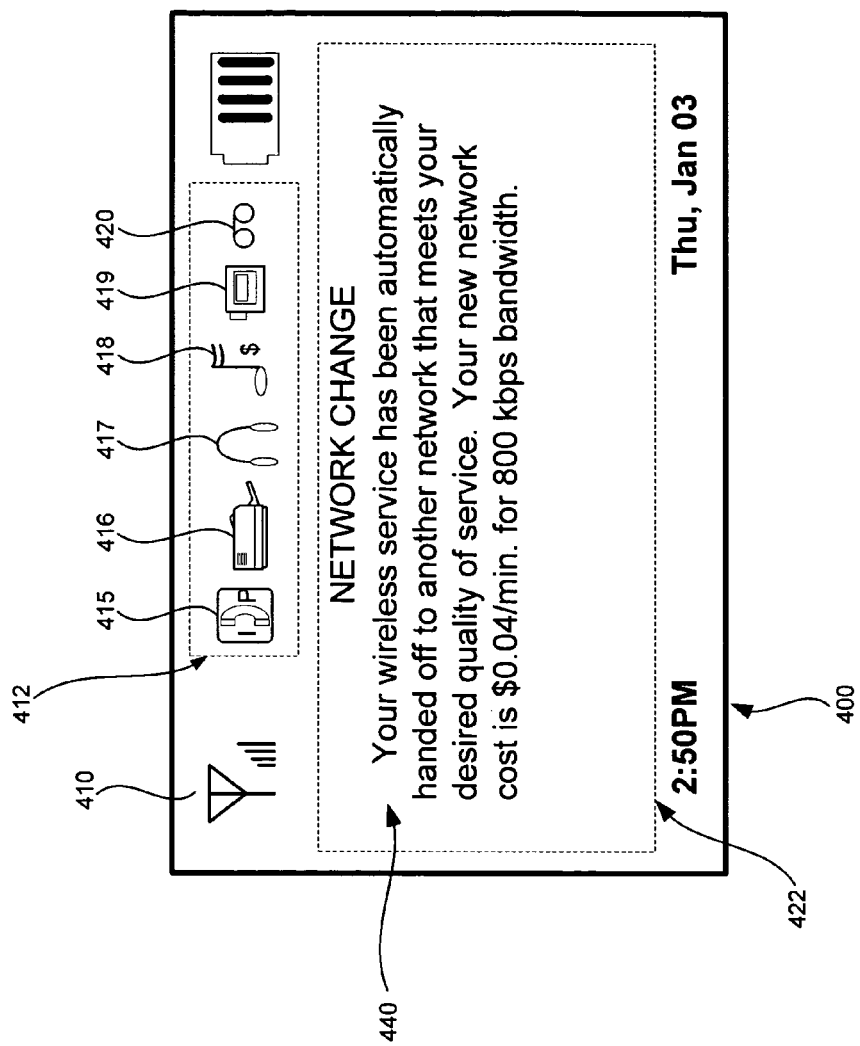
FIG. 4 shows an exemplary display notifying a user of a mobile access device that may correspond to, for example, the mobile access device of FIG. 2, of the automatic selection of a new communication network, in accordance with a representative embodiment of the present invention.

FIG. 4 shows an exemplary display 400 notifying a user of a mobile access device that may correspond to, for example, the mobile access device 224 of FIG. 2, of the automatic selection of a new communication network, in accordance with a representative embodiment of the present invention. The display 400 of FIG. 4 comprises a network indicator 410, a network services indicator area 412, a battery life indicator, a time of day indicator, and a day and date indicator. In addition, in the example of FIG. 4, the network services indicator area 412 has been updated to comprise an Internet protocol (IP) phone service icon 415, a printer service icon 416, a stereo entertainment icon 417, a pay music service icon 418, a video entertainment icon 419, and a storage service icon 420 showing those services advertised by the wireless broadband access gateway as being available. The display 400 also comprises a display area 422 to allow an access device to present graphical or textual information for a variety of reasons and from a number of sources. In the illustration of FIG. 4, the mobile access device has displayed information 440 about a newly detected network indicating that a hand-off or switch of serving networks has been automatically performed in accordance with user-defined criteria. Although the exemplary displayed information 440 shown in FIG. 4 shows only the usage cost and available bandwidth of the new serving network, a greater or lesser number of characteristics may be provided without departing from the spirit and scope of the present invention.

In yet another representative embodiment of the present invention, a mobile access device such as, for example, the mobile access devices 224 may be served by a wireless wide area network such as the GSM/EDGE/GPRS network 214, for example. While being served by the GSM/EDGE/GPRS network 214, the mobile access device 224 may function to "sniff" the radio frequency spectrum in which the mobile access device 224 is capable of operating to detect the presence of other communication networks. Upon detecting the presence of other communications network(s), the mobile access device 224 may configure itself to receive information broadcast by the new network. The broadcast information may advertise, for example, what services the new network has to offer, the cost of services that are available via the new network, and network performance information such as, for example, the amount of available bandwidth and transmission delays, channels in use, protocols supported, operator identifier, and other factors. The mobile access device 224 may present such information to the user for consideration. FIGS. 3 and 4 show network services indicator areas 312, 412 containing icons representing services that may be advertised by such a network. A representative embodiment of the present invention may, for example, use such a graphical display tool, or other graphical or textual formats to notify a user about services that may be available via a newly detected wireless communication network. A description of the advertising of network services via a broadband access gateway may be found in U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety.

Figure 5:
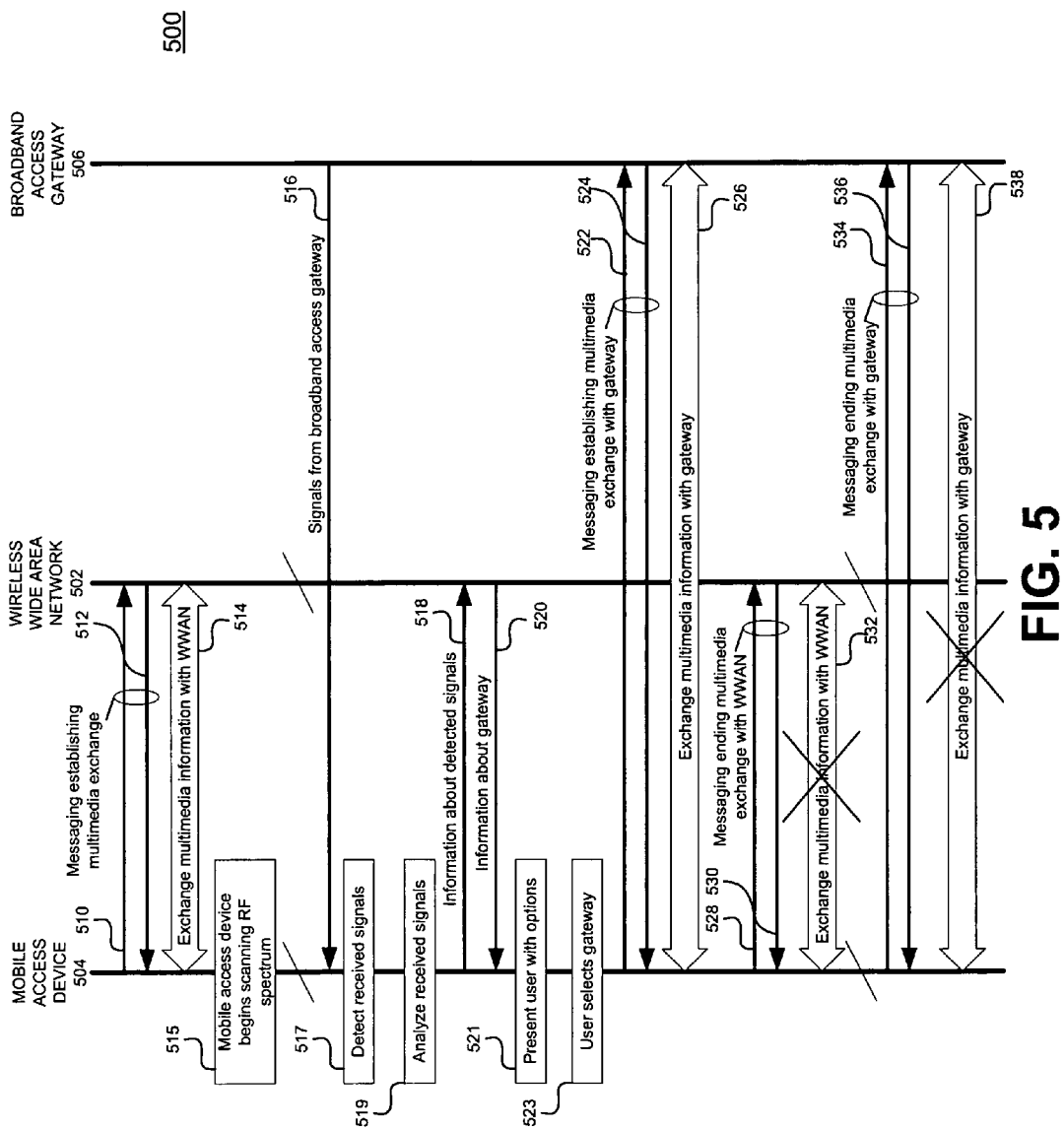
FIG. 5 shows a message exchange diagram illustrating an example of hand-off of a multimedia information stream using background network scanning, in accordance with a representative embodiment of the present invention.

FIG. 5 shows a message exchange diagram 500 illustrating an example of hand-off of a multimedia information stream using background network scanning, in accordance with a representative embodiment of the present invention. In the illustration of FIG. 5, the three vertical lines represent a wireless wide area network 502, a mobile access device 504, and a broadband access gateway 506 that may correspond to, for example, the GSM/EDGE/GPRS network 214, the mobile access device 224, and the broadband access gateway 218, respectively, of FIG. 2. The horizontal lines of FIG. 5 represent message traffic or groups of messages exchanged between a source and a destination, the destination being indicated by the arrow head. The vertical dimension represents time, advancing downward on the message exchange diagram 500.

In a representative embodiment of the present invention, the mobile access device 504 may initiate an exchange of multimedia information via the wireless wide area network 502 using messaging 510, 512 with any of several network entities including, for example, another mobile access device served by the wireless wide area network 502, or a party accessible via the transport network 232 of FIG. 2 such as, for example, the content provider 210. Although this example describes the initiation of an exchange by the mobile access device 504, a similar sequence of events within the spirit and scope of the present invention may be applied to exchanges involving the mobile access device 504 that are initiated by other than the mobile access device 504. The messaging 510, 512 may comprise multiple messages for establishing communication between the mobile access device 504 and the wireless wide area network 502. In the illustration of FIG. 5, the wireless wide area network 502 may activate path 514 and may use the path 514 to transport multimedia information between the wireless wide area network 502 and the mobile access device 504. The mobile access device 504 may then activate background network scanning functionality 515, to detect the presence of compatible wireless networks. At a later time, the mobile access device 504 may migrate to within the coverage area of a wireless service provider such as, for example, the broadband access gateway 506 that may correspond to the broadband access gateway 218 with wireless interface 220, of FIG. 2. The background network scanning functionality 515 of the mobile access device 504 may, at 517, detect the presence of signals 516 from the broadband access gateway 506, may analyze the received signals, at 519, and may send information about the detected signals to the serving wireless network (i.e., the wireless wide area network 502) as messaging 518. The serving wireless wide area network 502 may respond in messaging 520 with information about the broadband access gateway 506 including, for example, information enabling the mobile access device 504 to access the broadband access gateway 506. The mobile access may, at 521, present the user with options regarding continued service with the present wireless service provider (e.g., the wireless wide area network 502), and about the newly detected coverage provided by the broadband access gateway 506.

The user may, at 523, elect to hand-off or switch coverage to the broadband access gateway 506, and may cause messaging 522 to be sent to the broadband access gateway 506 to request service. The broadband access gateway may accept service for the mobile access device 504, may notify the mobile access device using messaging 524, and may establish a path 526 for communication with the mobile access device 504. The mobile access device 504 may, once service via the newly detected coverage of broadband access gateway 506 is established, exchange messaging 528, 530 to dismantle path 532 that was originally establish as path 514. At yet a later time, the user of the mobile access device 504 may decide to end the exchange of multimedia information, and may cause messaging 534 to be sent to the broadband access gateway 506. The broadband access gateway may acknowledge the request with messaging 536, and may then disable the path 538 (originally established as path 526) between the broadband access gateway 506 and the mobile access device 504.

In still another representative embodiment of the present invention, a mobile access device such as, for example, the mobile access devices 224 may be served by a wireless wide area network such as the GSM/EDGE/GPRS network 214, for example. While being served by the GSM/EDGE/GPRS network 214, the mobile access device 224 may function to "sniff" the radio frequency spectrum in which the mobile access device 224 is capable of operating to detect the presence of other communication networks. Upon detecting the presence of another communications network such as that supported by the broadband access gateway 218 with the wireless interface 220, for example, the mobile access device 224 may establish a second communication link using the new network. Once the second communication path is established, the mobile access device 224 may use the connection to actively determine characteristics of the new network for exchange of the same or similar information as that being carried by the current serving communication network. This may permit the mobile access device to accurately determine the expected performance of the new network in serving the current needs of the user of the mobile access device.

For example, while exchanging multimedia information via the GSM/EDGE/GPRS network 214, the mobile access device 224 may establish a second communication path via the broadband access gateway 218 and BAP 206 by which to exchange a portion of the multimedia information. During the exchange, the mobile access device 224 may observe network characteristics of the second communication path such as, for example, round-trip-delay and packet error rate. Based upon the corresponding characteristics for each of the two communication paths, the mobile access device 218 may automatically, or with user involvement, select use of one or both of the two communication paths for the remainder of the communication session. A representative embodiment of the present invention may, by actively analyzing characteristics of a newly detected network, determine that the quality of service provided a user may be improved by selecting the newly detected and analyzed network. Although the analysis and selection of only one additional communication path is described here, the mobile access device may become aware of, analyze the characteristics of, and select from a greater number of additional communication paths without departing from the spirit and scope of the present invention.

Figure 6:
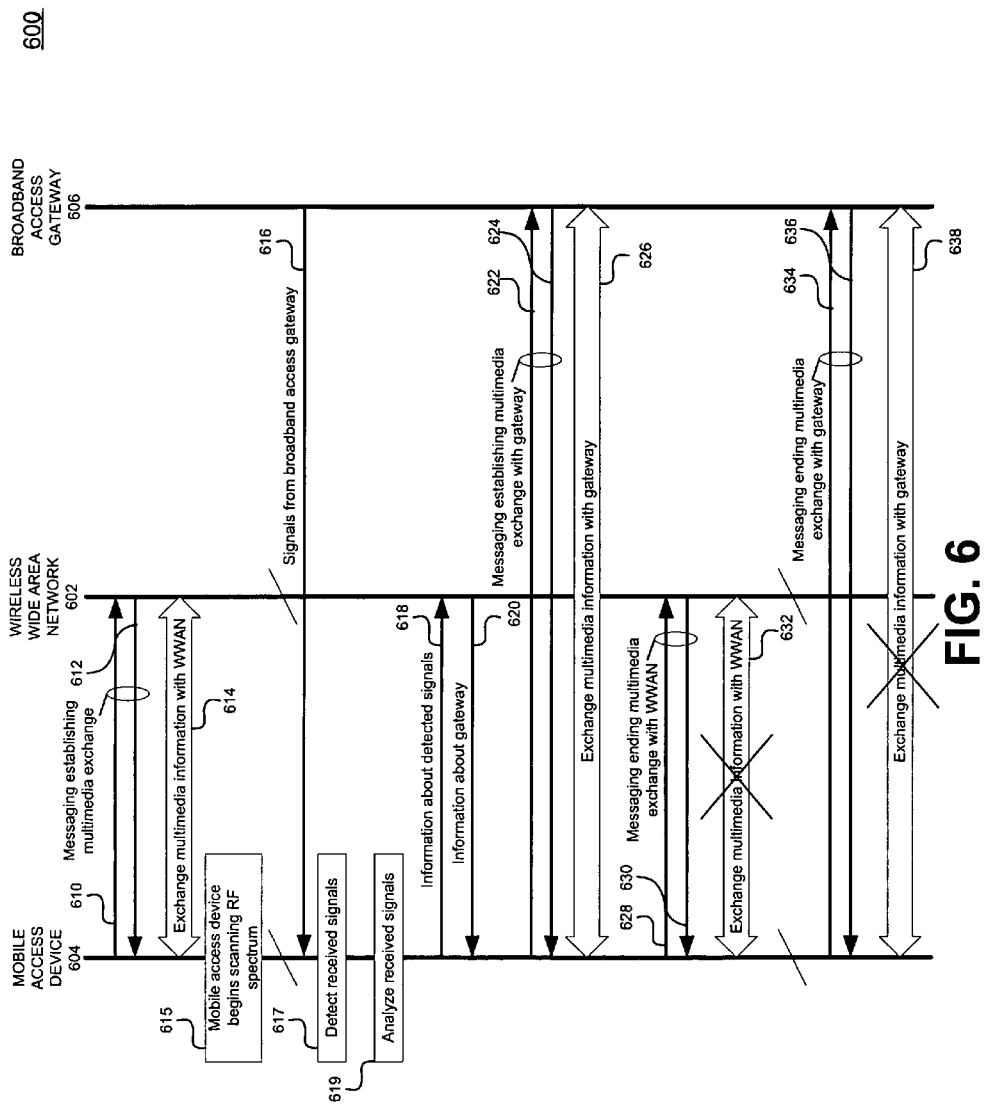
FIG. 6 shows a message exchange diagram illustrating an example of hand-off of a multimedia information stream using background network scanning in which a mobile access device establishes a simulcast connection with a second wireless service provider to actively determine network characteristics, in accordance with a representative embodiment of the present invention.

FIG. 6 shows a message exchange diagram 600 illustrating an example of hand-off of a multimedia information stream using background network scanning in which a mobile access device establishes a simulcast connection with a second wireless service provider to actively determine network characteristics, in accordance with a representative embodiment of the present invention. In the illustration of FIG. 6, the three vertical lines represent a wireless wide area network 602, a mobile access device 604, and a broadband access gateway 606 that may correspond to, for example, the GSM/EDGE/GPRS network 214, the mobile access device 224, and the broadband access gateway 218, respectively, of FIG. 2. The horizontal lines of FIG. 6 represent message traffic or groups of messages exchanged between a source and a destination, the destination being indicated by the arrow head. The vertical dimension represents time, advancing downward on the message exchange diagram 600.

In a representative embodiment of the present invention, the mobile access device 604 may initiate an exchange of multimedia information via the wireless wide area network 602 using messaging 610, 612 with any of several network entities including, for example, another mobile access device served by the wireless wide area network 602, or a party accessible via the transport network 232 of FIG. 2 such as, for example, the content provider 210. Although this example describes the initiation of an exchange by the mobile access device 604, a similar sequence of events within the spirit and scope of the present invention may be applied to exchanges involving the mobile access device 604 that are initiated by other than the mobile access device 604. The messaging 610, 612 may comprise multiple messages for establishing communication between the mobile access device 604 and the wireless wide area network 602. In the illustration of FIG. 6, the wireless wide area network 602 may activate path 614 and may use the path 614 to transport multimedia information between the wireless wide area network 602 and the mobile access device 604. The mobile access device 604 may then activate background network scanning functionality 615, to detect the presence of compatible wireless networks. At a later time, the mobile access device 604 may migrate to within the coverage area of a wireless service provider such as, for example, the broadband access gateway 606 that may correspond to, for example, the broadband access gateway 218 with wireless interface 220, of FIG. 2. The background network scanning functionality 615 of the mobile access device 604 may, at 617, detect the presence of signals 616 from the broadband access gateway 606, and may analyze the received signals, at 619. In one representative embodiment, the mobile access device 604 may send information about the detected signals to the serving wireless network (i.e., the wireless wide area network 602) as messaging 618. The serving wireless wide area network 602 may respond in messaging 620 with information about the broadband access gateway 606 including, for example, information enabling the mobile access device 604 to access the broadband access gateway 606. The mobile access device 604 may then engage in messaging 622, 624 to establish a path 626 between the mobile access device 604 and the broadband access gateway 606. In another representative embodiment, the mobile access device 604 may, using information about the detected signals from the background network scanning functionality 615, contact the broadband access gateway 606 directly using messaging 622, 624 to establish a path 626 via the broadband access gateway 606.

Once the path 626 is established, the mobile access device may use the path 626 to carry some or all of the information previously being transported by the path 614 of with wireless wide area network 602. The mobile access device may observe messaging on both of the paths 614 and 626, and may, for example, determine actual path characteristics such as, for example, bit rates, error rates, round-trip delays, and quality of service. In one representative embodiment of the present invention, the user may be notified of the properties and characteristics of the two paths, and may manually choose to hand-off or switch coverage to the broadband access gateway 606. In another representative embodiment of the present invention, the mobile access device 604 may use user-defined criteria such as guidelines, rules, parameters, and limits, for example, to automatically hand-off or switch the path 626 via which to continue the exchange of multimedia information.

Once the path 626 is established as the carrier of multimedia information being exchanged by the mobile access device 604, the mobile access device may exchange messaging 628, 630 with the wireless wide area network 602 to dismantle the path 632 that originated as path 614. At some later time, the user of the mobile access device 604 may choose to end the exchange of multimedia information, and may cause messaging 634 to be sent to the broadband access gateway 606. The broadband access gateway may acknowledge the request with messaging 636, and may then disable the path 638 (originally established as path 626) between the broadband access gateway 606 and the mobile access device 604.

Figure 7A:
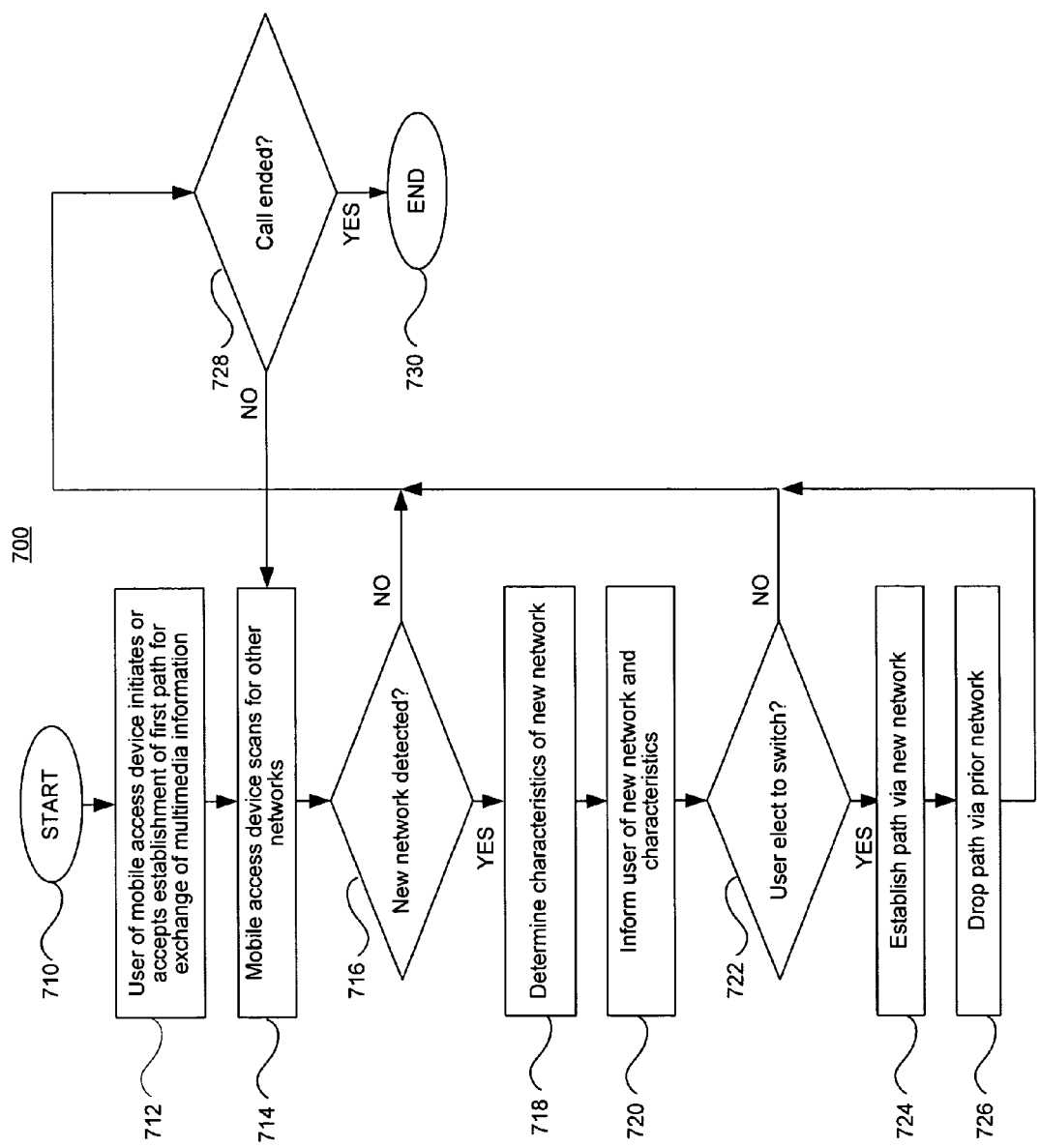
FIG. 7A is a flowchart illustrating an exemplary method of supporting hand-off of a mobile access device such as, for example, the mobile access device of FIG. 2 using background network scanning, in accordance with a representative embodiment of the present invention.

FIG. 7A is a flowchart illustrating an exemplary method of supporting hand-off of a mobile access device such as, for example, the mobile access device 224 of FIG. 2 using background network scanning, in accordance with a representative embodiment of the present invention. As an aid to understanding the method of FIG. 7A, the following description makes reference to elements of FIG. 2. The method of FIG. 7A begins with a mobile access device such as, for example, the mobile access device 224 in an idle state (block 710). At some point, the user of the mobile access device 224 elects to initiate or accept the establishment of a communication path or channel for the exchange of multimedia information (block 712). This may result from the placing or acceptance of a call involving multimedia information, or an attempt to access a source of multimedia information via, for example, a wireless wide area network such as the GSM/EDGE/GPRS network 214 of FIG. 2. Following establishment of the communication path, the mobile access device 224 may commence scanning portions of the radio frequency spectrum with which it is compatible (block 714), to determine whether other networks may be available. The mobile access device then determines whether a new network is present (block 716). If no new network is detected (block 716), a determination is made as to whether the call or connection has ended (block 728). If the call or connection has ended (block 728), the method of FIG. 7A ends (block 730). If the call or connection has not ended, the method loops and again sniffs for the presence of signals from another network (block 714).

If a new network is detected (block 716), the mobile access device may determine characteristics of the new network (block 718). In one representative embodiment of the present invention, the mobile access device may be capable of autonomously determining sufficient information to enable it to access the newly detected network. In another representative embodiment, the mobile access device may provide information about the newly detected network to the current serving network, or to another entity accessible via the current serving network, in order to determine information enabling access to the newly detected network. In either case, the mobile access device 224 may inform the user of the characteristics of the newly detected network, and may prompt the user to make a selection (block 720). If the user elects to remain with the current serving network (block 722) the method of FIG. 7A checks for the end of the call or connection (block 728) and follows the events described above. If, however, the user elects to switch to the new detected network (block 722), the mobile access device may cause a new path to be established via the new network (block 724), and the previous path to be dropped (block 726). The method of FIG. 7A then continues by checking for the end of the call or connection (block 728), as described above.

FIG. 7B is a flowchart illustrating another exemplary method of supporting hand-off of a mobile access device such as, for example, the mobile access device 224 of FIG. 2 using background network scanning, in accordance with a representative embodiment of the present invention. As an aid to understanding the method of FIG. 7B, the following description makes reference to elements of FIG. 2. The method of FIG. 7B begins with a mobile access device such as, for example, the mobile access device 224 in an idle state (block 710). At some point, the user of the mobile access device 224 elects to initiate or accept the establishment of a communication path or channel for the exchange of multimedia information (block 712). This may result from the placing or acceptance of a call involving multimedia information, or an attempt to access a source of multimedia information via, for example, a wireless wide area network such as the GSM/EDGE/GPRS network 214 of FIG. 2. Following establishment of the communication path, the mobile access device 224 may commence scanning portions of the radio frequency spectrum with which it is compatible (block 714), to determine whether other networks may be available. The mobile access device then determines whether a new network has been detected (block 716). If no new network is detected (block 716), a determination is made as to whether the call or connection has ended (block 734). If the call or connection has ended (block 734), the method of FIG. 7B ends (block 736). If the call or connection has not ended, the method of FIG. 7B loops and again sniffs for the presence of signals from another network (block 714).

If a new network is detected (block 716), the mobile access device may determine characteristics of the new network (block 718). In one representative embodiment of the present invention, the mobile access device may be capable of autonomously determining sufficient information to enable it to access the newly detected network. In another representative embodiment, the mobile access device may provide information about the newly detected network to the current serving network, or another entity accessible via the current serving network, in order to determine information enabling access to the newly detected network. In either case, the mobile access device 224 may establish a second path via the newly detected network (block 720), and may begin exchanging, via the second path, some or all of the multimedia information currently being exchanged via the path via the wireless wide area network (block 722). The mobile access device may analyze network characteristics of the exchanges of the original and second network paths (block 724), may inform the user of the characteristics of the original and the newly detected networks, and may prompt the user to make a selection (block 726). If the user elects to remain with the current serving network (block 728), the method of FIG. 7B checks for the end of the call or connection (block 734) and loops back, following the events described above. If, however, the user elects to switch to the new detected network (block 728), the mobile access device may use the new path via the newly detected network for the entire exchange (block 730), and the previous path may be dropped (block 732). The method of FIG. 7B then continues by checking for the end of the call or connection (block 734), and the method either ends (block 736), or loops as described above.

Figure 7C:
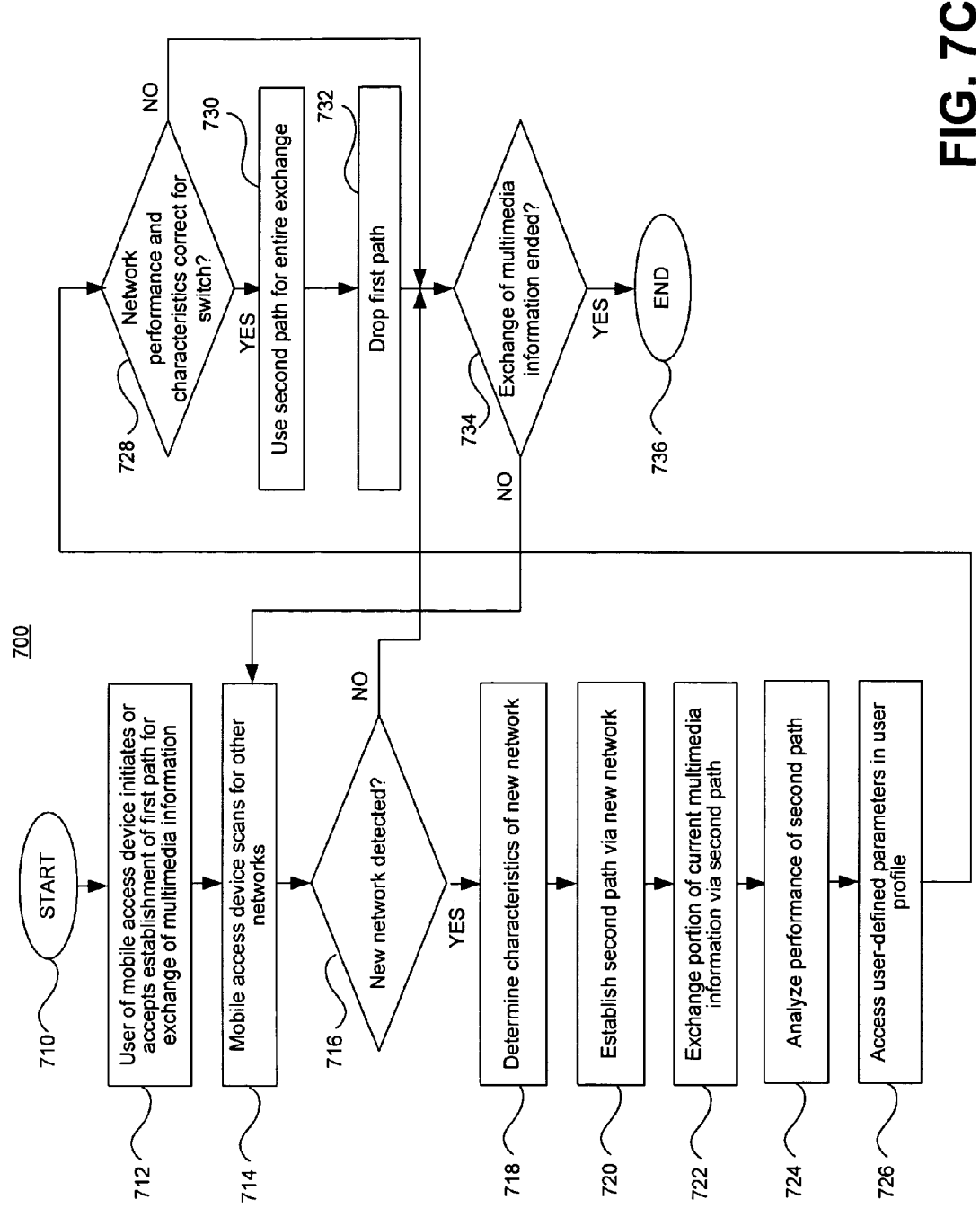
FIG. 7C is a flowchart illustrating yet another exemplary method of supporting hand-off of a mobile access device such as, for example, the mobile access device of FIG. 2 using background network scanning, in accordance with a representative embodiment of the present invention.

FIG. 7C is a flowchart illustrating yet another exemplary method of supporting hand-off of a mobile access device such as, for example, the mobile access device 224 of FIG. 2 using background network scanning, in accordance with a representative embodiment of the present invention. As an aid to understanding the method of FIG. 7C, the following description makes reference to elements of FIG. 2. The actions of the method of FIG. 7C are the same as the method of FIG. 7B, from the beginning (block 710), up to and including the analysis of the performance of the second communication path (block 724). At the next action (block 726), however, the mobile access device instead of informing a user of network characteristics for the second path, accesses a set of user-defined parameters or criteria (e.g., guidelines, limits, rules, values) that may reside in a user profile such as the user profile 225, for example. The method of FIG. 7C then makes a determination of whether the performance of the newly detected network is correct for a hand-off or switch from the original serving network (e.g., the GSM/EDGE/GPRS network 214) to the second path of the newly detected network (e.g., the broadband access gateway 218 with wireless interface 220) (block 728). If the performance and characteristics are not correct for a hand-off or switch (block 728), the method checks whether the exchange of multimedia information is ended (block 734). If the exchange has ended (block 734), the method ends (block 736), while if it has not ended, the method of FIG. 7C loops back to sniff again (block 714), as described above. If, however, the performance and characteristics are correct for a hand-off or switch (block 728), the mobile access device may elect to use the second path for the remainder of the exchange (block 730), and may drop the original or first communication path (block 732). The method of FIG. 7C then checks whether the exchange of multimedia information has ended (block 734), and if it has not, loops back as described above. If the multimedia exchange has ended, the method of FIG. 7C terminates (block 736).

Figure 7D:
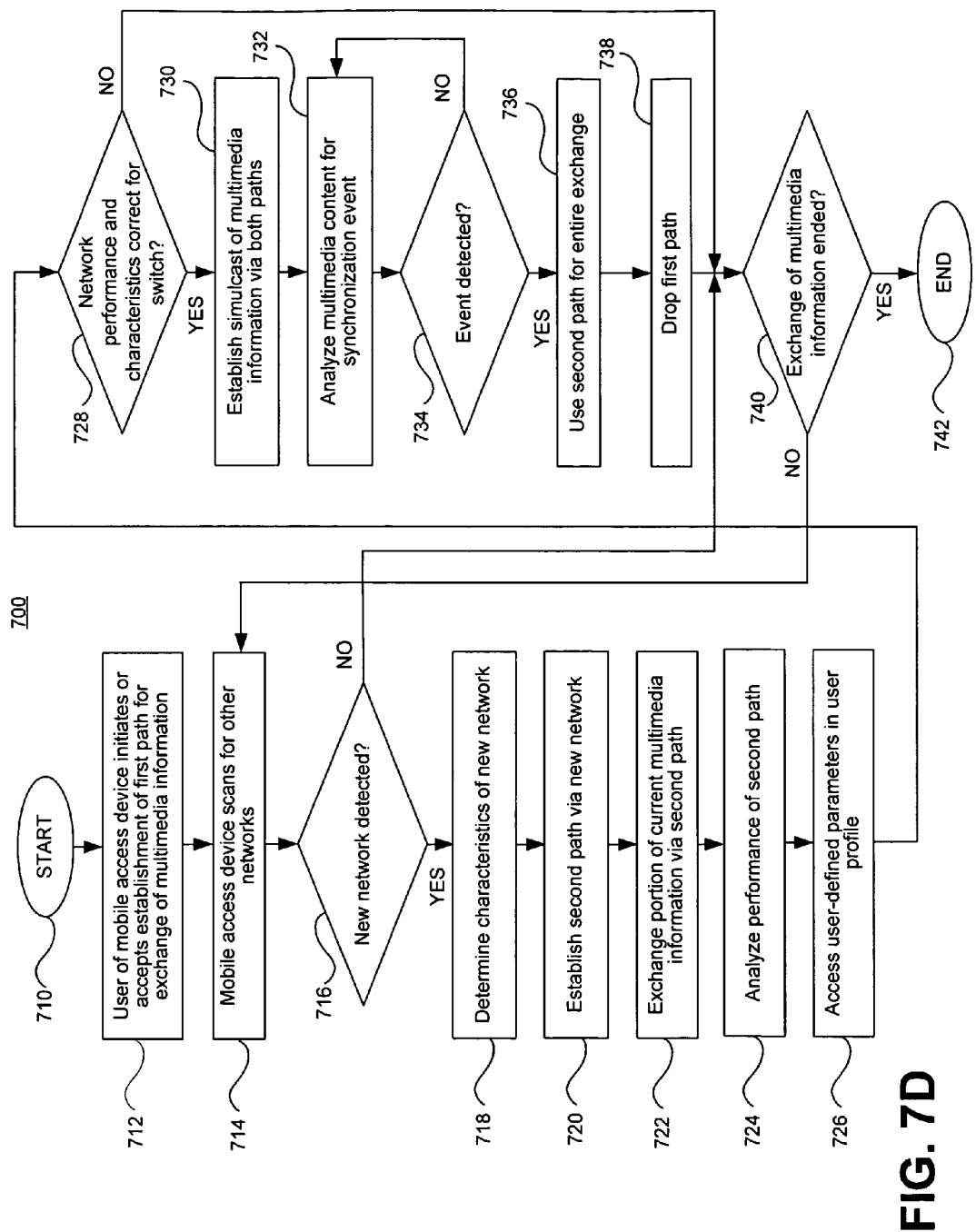
FIG. 7D is a flowchart illustrating still another exemplary method of supporting hand-off of a mobile access device such as, for example, the mobile access device of FIG. 2 using background network scanning, in accordance with a representative embodiment of the present invention.

FIG. 7D is a flowchart illustrating still another exemplary method of supporting hand-off of a mobile access device such as, for example, the mobile access device 224 of FIG. 2 using background network scanning, in accordance with a representative embodiment of the present invention. As an aid to understanding the method of FIG. 7D, the following description makes reference to elements of FIG. 2. The actions of the exemplary method of FIG. 7D are the same as the method of FIG. 7C, from the beginning (block 710), up to and including the determination of whether the performance of the newly detected network is correct for a hand-off or switch (block 728). If the performance and characteristics are not correct for a hand-off or switch (block 728), the method checks whether the exchange of multimedia information is ended (block 740). If the exchange has ended (block 740), the method ends (block 742), while if it has not ended, the method of FIG. 7D loops back to sniff again (block 714), as described above. If, however, the performance and characteristics are correct for a hand-off or switch (block 728), the mobile access device may establish a simulcast exchange of multimedia information via both the original and second paths (block 730), and may analyze the multimedia content being exchanged via the paths for a synchronization event for the hand-off or switch (block 732). For example, if the multimedia information being exchanged comprises blocks or frames of information that acts as reference information for other frames that come after such as with, for example MPEG-encoded video, the method of FIG. 7D may analyze or examine the multimedia content so as to recognize such reference frames or events. By recognizing the importance and occurrence of such reference events or frames, a representative embodiment of the present invention may minimize the impact of the switch or hand-off from one communication path to the other.

If a synchronization event is not detected (block 734), the method of FIG. 7D loops and continues analyzing the exchanged multimedia content (block 732). If, however, the synchronization event is detected (block 734), the hand-off or switch from the original to the second communication path may occur, and the second path may be employed for the exchange from that point forward (block 736). In addition, the original or first path may be dropped (block 738). The method of FIG. 7D then checks whether the exchange of multimedia information is ended (block 740), and if it has not, loops back as described above (block 714). If, however, the multimedia exchange has ended, the method of FIG. 7D ends (block 742).

Aspects of the present invention may be seen in a method supporting hand-off of a multimedia call session using background network scanning. Such a method may comprise exchanging a multimedia information stream via a first wireless network having at least one of a first set of services and a first quality of service, detecting a second wireless network using background network scanning of at least one portion of radio frequency spectrum, and determining at least one of a second set of services and a second quality of service for the second wireless network. The method may also comprise comparing the at least one of a first set of services and a first quality of service and the at least one of a second set of services and a second quality of service, and handing-off communication of the multimedia information stream to the second wireless network. In a representative embodiment of the present invention, the determining may comprise one of querying the second wireless network to determine the at least one of a second set of services and a second quality of service, and receiving from the second wireless network, advertising information for the at least one of a second set of services and a second quality of service. The determining may comprise informing the first wireless network of detection of the second wireless network, and receiving from the first wireless network, information about the at least one of a second set of services and a second quality of service. Handing-off may comprise one of automatically selecting one of the first wireless network and the second wireless network based upon the comparison and at least one user-defined criteria, and selecting to exchange the multimedia information stream via the second network in response to input from a user. In various representative embodiments of the present invention, the at least one user-defined criteria may comprise one of a cost, a bit rate, a bandwidth, a spatial resolution, a grey scale level, a color depth, a frame rate, an error rate, a quality of service, and a network delay. A representative embodiment of the present invention may also comprise notifying a user of a result of the comparison, and receiving, from the user, input related to selection of a wireless network.

In a representative embodiment of the present invention, the first wireless network may comprise a wireless wide area network, and the wireless wide area network may comprise at least one of a global system for mobile communications (GSM) network, a time division multiple access (TDMA) network, a code division multiple access (CDMA) network, and a universal mobile telecommunications system (UMTS) network. The second wireless network may comprise at least one of a broadband access gateway, an access point, a hotspot, and a broadband network. The broadband network in various representative embodiments in accordance with the present invention may comprise at least one of a digital subscriber line (DSL) network, a cable network, a satellite network, a local multipoint distribution system (LMDS), and the Internet. In some representative embodiments of the present invention, the second wireless network may be compliant with at least one of a Bluetooth V1.2 or compatible personal area network (PAN) specification and an Institute of Electrical and Electronics Engineers (IEEE) 802.15.3a or compatible ultrawideband network specification. In other representative embodiments, the second wireless network may be compliant with at least one of the Institute of Electrical and Electronics Engineers (IEEE) 802.11a, 802.11b, 802.11g, and 802.11n standards. Multimedia information may comprise at least one of streaming video, broadcast video, voice, digital data, text, digitized audio, digitized still images, digitized video, and digitized music. The first wireless network and the second wireless network may at least one of occupy separate portions of radio frequency spectrum and employ incompatible communication protocols. In a representative embodiment of the present invention, the handing-off may be synchronized to a predetermined event in the stream of multimedia information. Quality of service may comprise at least one of a cost, a bit rate, a bandwidth, a spatial resolution, a grey scale level, a color depth, a frame rate, an error rate, a quality of service, and a network delay. In a representative embodiment of the present invention, background network scanning may comprise sniffing of radio frequency spectrum.

Other aspects of the present invention may be observed in a mobile access device supporting hand-off of a stream of multimedia information using background network scanning. In a representative embodiment of the present invention, the device may comprise at least one wireless interface capable of exchanging multimedia information with a first wireless network while scanning at least a portion of radio frequency spectrum to detect a second wireless network. The first wireless network may support at least one of a first set of services and a first quality of service and the second wireless network may support at least one of a second set of services and a second quality of service. The device may also comprise storage comprising at least one user-defined criteria employed in selecting one of the first and second wireless networks, and software for comparing the at least one of a first set of services and a first quality of service and the at least one of a second set of services and a second quality of service. A representative embodiment of the present invention may be capable handing-off the exchanging of multimedia information between the first wireless network and the second wireless network based upon the at least one user-defined criteria and the comparison of the at least one of a first set of services and a first quality of service and the at least one of a second set of services and a second quality of service.

In various representative embodiments in accordance with the present invention, the multimedia information may comprise at least one of streaming video, broadcast video, voice, digital data, text, digitized audio, digitized still images, digitized video, and digitized music. The first wireless network may comprise at least one of a global system for mobile communications (GSM) network, a time division multiple access (TDMA) network, a code division multiple access (CDMA) network, and a universal mobile telecommunications system (UMTS) network. The second wireless network may be compliant with at least one of a Bluetooth V1.2 or compatible personal area network (PAN) specification, an Institute of Electrical and Electronics Engineers (IEEE) 802.15.3a or compatible ultrawideband network specification, and one of an Institute of Electrical and Electronics Engineers (IEEE) 802.11a, 802.11b, 802.11g, and 802.11n standard. The handing-off may be synchronized with a predetermined event in the stream of multimedia information. Quality of service may comprise at least one of a cost, a bit rate, a bandwidth, a spatial resolution, a grey scale level, a color depth, a frame rate, an error rate, a quality of service, and a network delay, and the at least one user-defined criteria may comprise at least one of a cost, a bit rate, a bandwidth, a spatial resolution, a grey scale level, a color depth, a frame rate, an error rate, a quality of service, and a network delay. In a representative embodiment of the present invention, background network scanning may comprise sniffing of radio frequency spectrum.

In a representative embodiment of the present invention, the wireless local area networks may include data networks such as, for example, Institute of Electrical and Electronics Engineer (IEEE) 802.11a/b/g/n compliant wireless networks such as those located in homes, hot spots or an office. Such local area networks may operate in unlicensed radio frequency spectrum such as in, for example, the 2.4 and 5-gigahertz regions. Examples of wide area networks may include cellular digital packet data (CDPD), voice and data networks such as public switched telephone networks (PSTN), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1xRT, Universal Mobile Telecommunications System (UMTS) network, to name only a few.

A personal area network (PAN) may be formed by a plurality of wireless communication access devices such as, for example, mobile multimedia handsets, PDAs, telephones, and computers. Other elements of such a network may, for example, include computer peripherals such as digital scanners, digital cameras, printers, headphones, and pointing devices, that may be located within the immediate proximity of a person. A PAN may be an ad-hoc network of such communication devices. In a representative embodiment of the present invention, access devices within the PAN may communicate with other access devices within the PAN and also with other access devices that are located in other networks accessible via the PAN. The personal area networks may include data networks such as, for example, a Bluetooth compliant network, and Institute of Electrical and Electronics Engineers (IEEE) 802.15.3a compliant wireless networks. Such personal area networks may operate in unlicensed radio frequency spectrum such as, for example, the 2.4 and 5-gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth® wireless PAN, a first Bluetooth®-enabled wireless access device may communicate with a second Bluetooth®-enabled wireless access device within the PAN. Additionally, either of the first and second Bluetooth®-enabled wireless access devices may communicate with the Internet or another LAN or WAN via the Bluetooth® wireless PAN.

In a representative embodiment of the present invention, a gateway may be adapted to provide seamless and transparent communication between a plurality of access devices and a plurality of networks. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

Content and application services are considerations because all the information coming into and leaving the home from either the WAN side (i.e., the broadband connection side), or from the PAN side (i.e., the access device side) converges at the gateway. The PAN side may comprise Bluetooth, wireless LAN (IEEE 802.11a/b/g/n), IEEE 802.15.3a ultra-wideband, or cellular, for example. Notwithstanding, the gateway may be adapted to convert, for example, wirelessly received GSM-formatted information into, for example, Internet protocol (IP)-formatted information and in reverse, converts IP-formatted information into wireless GSM-formatted information suitable for over-the-air transmission. Support for other wireless communication protocols such as TDMA, CDMA, and UMTS may also be provided. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

The gateway in a representative embodiment of the present invention may be adapted to route calls based on established rules that may be programmed into the gateway. For example, the gateway may be governed by a rule which states that local calls are to be routed to an incumbent local exchange carrier (iLEC), while long distance calls are to be handled by Long Distance Carrier Company. Accordingly, when a call originates at the gateway and it is determined that the call is a local call, the gateway may be adapted to route the call to the iLEC. However, if the gateway determines that the call is a long distance call, then the gateway may be adapted to route the call to Long Distance Carrier Company.

A representative embodiment of the present invention may leverage existing broadband infrastructure that is commonly found in many homes and businesses today. Because a consumer is already paying for the use of the broadband infrastructure in their home or office, leveraging the use of the existing broadband infrastructure for communication with wide area networks results in minimal or no communication costs. The broadband infrastructure may be, for example, a cable or DSL infrastructure.

The wireless interface function provided by the gateway located within a home, for example, may be utilized to route or communicate a great deal of traffic to a wired network such as a broadband network or a wireless network such as a GSM or CDMA network via a broadband connection. In other words, the wireless gateway infrastructure provided by a representative embodiment of the present invention provides a scalable network infrastructure that rides on an existing access infrastructure already supplied by a broadband service provider to a home, office or business. Additionally, the scalable infrastructure provided by the gateway also solves the problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (ILECs) or other LECs.

The unlicensed mobile access gateway described above may possess a significant amount of processing power. The gateways of existing systems fall short of realizing the full potential of the merged wired and wireless communication network that is enabled by a representative embodiment of the present invention. Numerous basic and enhanced communication services may be enabled or provided by the gateway. Support for access devices such as, for example, mobile multimedia handsets and PDAs may be involved in order to utilize these basic and enhanced communication services enabled by the new wave of digital technologies. Current and/or proposed mobile access gateway systems, however, do not provide the range of support needed for their use by the everyday consumer.

In a representative embodiment of the present invention, an access device such as, for example, a mobile multimedia handset engaged in a call served by a wireless wide area network may migrate to within the coverage area of an associated broadband access gateway with a wireless interface. The wireless wide area network may simulcast call content to the broadband access gateway via a broadband network. A user in the proximity of the broadband access gateway may be notified of the simulcasting of the call, and may elect to continue the call via a cordless phone or other access device that is compatible with the wired and/or wireless interfaces of the broadband access gateway.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method supporting hand-off of a multimedia call session using background network scanning, the method comprising:
    in a handheld communication device,
    communicating a first user multimedia information stream via a first wireless network having one or both of: a first set of services and/or a first quality of service;
    determining one or more performance characteristics of the first wireless network during communication of the first user multimedia information stream;
    detecting a radio frequency signal of a second wireless network using the background network scanning of at least one portion of radio frequency spectrum;
    responsive to the detection, determining one or more performance characteristics of the second wireless network by automatically establishing communication via the second wireless network of a second user multimedia information stream;
    comparing the one or more performance characteristics of the first wireless network and the one or more performance characteristics of the second wireless network;
    deciding to hand-off communication of the multimedia call session to the second wireless network based on the comparing; and
    after the comparing and deciding, handing-off the communication of the multimedia call session to the second wireless network, wherein the handing-off is synchronized to a predetermined event in one or both of: the first user multimedia information stream and/or the second user multimedia information stream.

2. The method according to claim 1, wherein the determining comprises one of:
    receiving, from the second wireless network, advertising information for one or both of: a second set of services and/or a second quality of service.

3. The method according to claim 1, wherein the determining comprises:
    informing the first wireless network of detection of the second wireless network; and
    receiving, from the first wireless network, information about one or both of: a second set of services and/or a second quality of service.

4. The method according to claim 1, wherein the handing-off comprises one of:
    automatically selecting one of: the first wireless network or the second wireless network, based upon the comparison and at least one user-defined criteria; or
    selecting to communicate a multimedia information stream via the second wireless network in response to input from a user.

5. The method according to claim 4, wherein the at least one user-defined criteria comprises one of: a cost, a bit rate, a bandwidth, a spatial resolution, a grey scale level, a color depth, a frame rate, an error rate, a quality of service, or a network delay.

6. The method according to claim 1, further comprising:
    notifying a user of a result of the comparison; and
    receiving, from the user, input related to selection of a wireless network.

7. The method according to claim 1, wherein the first wireless network comprises a wireless wide area network.

8. The method according to claim 7, wherein the wireless wide area network comprises one of: a global system for mobile communications (GSM) network, a time division multiple access (TDMA) network, a code division multiple access (CDMA) network, and/or a universal mobile telecommunications system (UMTS) network.

9. The method according to claim 1, wherein the second wireless network comprises one or more of: a broadband access gateway, an access point, a hotspot, and/or a broadband network.

10. The method according to claim 9, wherein the broadband network comprises one or more of: a digital subscriber line (DSL) network, a cable network, a satellite network, a local multipoint distribution system (LMDS), and/or the Internet.

11. The method according to claim 1, wherein the second wireless network is compliant with one or more of: a Bluetooth V1.2 or compatible personal area network (PAN) specification and/or an Institute of Electrical and Electronics Engineers (IEEE) 802.15.3a or compatible ultrawideband network specification.

12. The method according to claim 1, wherein the second wireless network is compliant with one or more of: the Institute of Electrical and Electronics Engineers (IEEE) 802.11a, 802.11b, 802.11g, and/or 802.11n standards.

13. The method according to claim 1, wherein user multimedia information comprises one or more of: streaming video, broadcast video, voice, digital data, text, digitized audio, digitized still images, digitized video, and/or digitized music.

14. The method according to claim 1, wherein the first wireless network and the second wireless network one or both of: occupy separate portions of radio frequency spectrum and/or employ incompatible communication protocols.

15. The method according to claim 1, wherein quality of service comprises one or more of: a cost, a bit rate, a bandwidth, a spatial resolution, a grey scale level, a color depth, a frame rate, an error rate, and/or a network delay.

16. The method according to claim 1, wherein the background network scanning comprises sniffing of the radio frequency spectrum.

17. The method according to claim 1, wherein the second user multimedia information stream comprises content same as that of the first user multimedia information stream.

18. The method according to claim 1, wherein the one or more performance characteristics comprise one of a network delay and a packet error rate.

19. A mobile access device supporting hand-off of a stream of user multimedia information using background network scanning, the device comprising:
   at least one wireless interface communicating a first stream of user multimedia information with a first wireless network while scanning at least a portion of radio frequency spectrum to detect a radio frequency signal of a second wireless network, wherein the first wireless network supports one or both of: a first set of services and/or a first quality of service, wherein the mobile access device determines one or more performance characteristics of the first wireless network during communication of the first stream of user multimedia information, and wherein the mobile access device, responsive to the detection, determines one or more performance characteristics of the second wireless network by automatically establishing communication via the second wireless network of a second user multimedia information stream;
   storage comprising at least one user-defined criteria employed in selecting one of the first and second wireless networks;
   software comparing the one or more performance characteristics of the first wireless network and the one or more performance characteristics of the second wireless network and for deciding to hand off the user multimedia information between the first wireless network and the second wireless network; and
   wherein after the comparing and deciding, the mobile access device hands off the communication of user multimedia information between the first wireless network and the second wireless network based upon the at least one user-defined criteria and the comparison of the one or more performance characteristics of the first wireless network and the one or more performance characteristics of the second wireless network, and wherein the hand-off is synchronized with a predetermined event in the stream of user multimedia information.

20. The device according to claim 19, wherein the user multimedia information comprises one or more of: streaming video, broadcast video, voice, digital data, text, digitized audio, digitized still images, digitized video, and/or digitized music.

21. The device according to claim 19, wherein the first wireless network comprises one or more of: a global system for mobile communications (GSM) network, a time division multiple access (TDMA) network, a code division multiple access (CDMA) network, and/or a universal mobile telecommunications system (UMTS) network.

22. The device according to claim 19, wherein the second wireless network is compliant with one or more of: a Bluetooth V1.2 or compatible personal area network (PAN) specification, an Institute of Electrical and Electronics Engineers (IEEE) 802.15.3a or compatible ultrawideband network specification, and/or one of an Institute of Electrical and Electronics Engineers (IEEE) 802.11a, 802.11b, 802.11g, or 802.11n standard.

23. The device according to claim 19, wherein quality of service comprises one or more of: a cost, a bit rate, a bandwidth, a spatial resolution, a grey scale level, a color depth, a frame rate, an error rate, and/or a network delay.

24. The device according to claim 19, wherein the at least one user-defined criteria comprises one or more of: a cost, a bit rate, a bandwidth, a spatial resolution, a grey scale level, a color depth, a frame rate, an error rate, a quality of service, and/or a network delay.

25. The device according to claim 19, wherein the scanning comprises sniffing of the radio frequency spectrum.

26. The method according to claim 19, wherein the hand-off comprises:
   communicating one portion of the user multimedia information stream via the first wireless network while communicating a separate other portion of the user multimedia information stream via the second wireless network, based upon the comparison.

27. The device according to claim 19, wherein the second user multimedia information stream comprises content same as that of the first user multimedia information stream.

28. The device according to claim 19, wherein the one or more performance characteristics comprise one of a network delay and a packet error rate.

29. One or more circuits configured to operate in a handheld communication device supporting hand-off of a multimedia call session using background network scanning, the one or more circuits comprising:
   at least one processor operably coupled to circuitry configured to communicate via a first wireless network and a second wireless network, the at least one processor operable to, at least:
      communicate a first user multimedia information stream via the first wireless network having one or both of: a first set of services and/or a first quality of service;
      determine one or more performance characteristics of the first wireless network during communication of the first user multimedia stream;
      detect a radio frequency signal of the second wireless network using the background network scanning of at least one portion of radio frequency spectrum;
      responsive to the detection, determine one or more performance characteristics of the second wireless network by automatically establishing communication via the second wireless network of a second user multimedia information stream;
      compare the one or more performance characteristics of the first wireless network and the one or more performance characteristics of the second wireless network;
      decide to hand-off communication of the multimedia call session to the second wireless network based on the comparing; and
      after the comparing and deciding, hand-off communication of the multimedia call session to the second wireless network, wherein the hand-off is synchronized to a predetermined event in one or both of: the first user multimedia information stream and/or the second user multimedia information stream.

30. The one or more circuits according to claim 29, wherein the determining comprises:
   receiving, from the second wireless network, advertising information for one or both of: a second set of services and/or a second quality of service.

31. The one or more circuits according to claim 29, wherein the determining comprises:
  informing the first wireless network of detection of the second wireless network; and
  receiving, from the first wireless network, information about one or both of: a second set of services and/or a second quality of service.

32. The one or more circuits according to claim 29, wherein the hand-off comprises one of:
  automatically selecting one of: the first wireless network or the second wireless network, based upon the comparison and at least one user-defined criteria; or
  selecting to communicate a multimedia information stream via the second wireless network in response to input from a user.

33. The one or more circuits according to claim 32, wherein the at least one user-defined criteria comprises one of: a cost, a bit rate, a bandwidth, a spatial resolution, a grey scale level, a color depth, a frame rate, an error rate, a quality of service, or a network delay.

34. The one or more circuits according to claim 29, wherein the at least one processor is operable to:
  notify a user of a result of the comparison; and
  receive, from the user, input related to selection of a wireless network.

35. The one or more circuits according to claim 29, wherein the first wireless network comprises a wireless wide area network.

36. The one or more circuits according to claim 35, wherein the wireless wide area network comprises one of: a global system for mobile communications (GSM) network, a time division multiple access (TDMA) network, a code division multiple access (CDMA) network, and/or a universal mobile telecommunications system (UMTS) network.

37. The one or more circuits according to claim 29, wherein the second wireless network comprises one or more of: a broadband access gateway, an access point, a hotspot, and/or a broadband network.

38. The one or more circuits according to claim 37, wherein the broadband network comprises one or more of: a digital subscriber line (DSL) network, a cable network, a satellite network, a local multipoint distribution system (LMDS), and/or the Internet.

39. The one or more circuits according to claim 29, wherein the second wireless network is compliant with one or more of: a Bluetooth V1.2 or compatible personal area network (PAN) specification and/or an Institute of Electrical and Electronics Engineers (IEEE) 802.15.3a or compatible ultrawideband network specification.

40. The one or more circuits according to claim 29, wherein the second wireless network is compliant with one or more of: the Institute of Electrical and Electronics Engineers (IEEE) 802.11a, 802.11b, 802.11g, and/or 802.11n standards.

41. The one or more circuits according to claim 29, wherein user multimedia information comprises one or more of: streaming video, broadcast video, voice, digital data, text, digitized audio, digitized still images, digitized video, and/or digitized music.

42. The one or more circuits according to claim 29, wherein the first wireless network and the second wireless network one or both of: occupy separate portions of radio frequency spectrum and/or employ incompatible communication protocols.

43. The one or more circuits according to claim 29, wherein quality of service comprises one or more of: a cost, a bit rate, a bandwidth, a spatial resolution, a grey scale level, a color depth, a frame rate, an error rate, and/or a network delay.

44. The one or more circuits according to claim 29, wherein the background network scanning comprises sniffing of radio frequency spectrum.

45. The one or more circuits according to claim 29, wherein the second user multimedia information stream comprises content same as that of the first user multimedia information stream.

46. The one or more circuits according to claim 29, wherein the one or more performance characteristics comprise one of a network delay and a packet error rate.

* * * * *